3,063,913
PROCESS FOR THE PREPARATION OF STREPTOKINASE
Wolfgang von Pölnitz, Frankfurt am Main, Hans Gerhard Schwick, Marburg (Lahn), and Jakob Hermann Bickhard, Gossfelden, Germany, assignors to Behringwerke Aktiengesellschaft, Marburg (Lahn), Germany, a corporation of Germany
Filed Dec. 20, 1960, Ser. No. 77,065
Claims priority, application Germany Dec. 29, 1959
2 Claims. (Cl. 195—65)

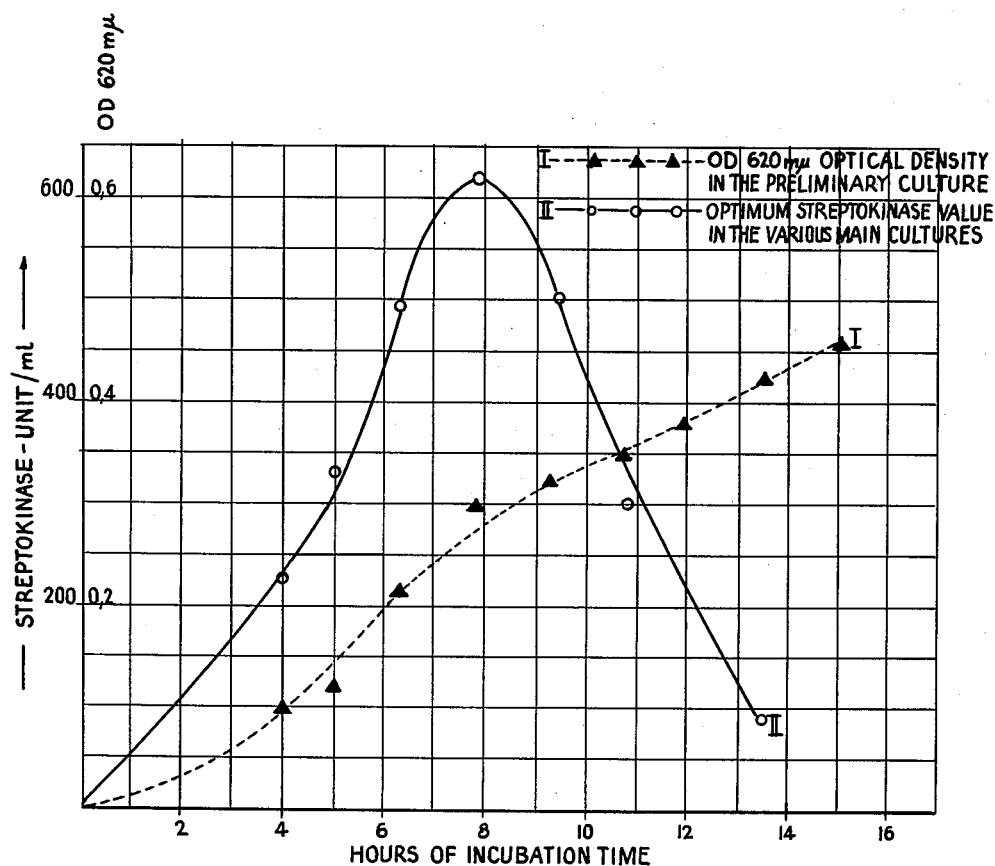

The present process relates to the preparation of streptokinase. This process especially relates to measures for reaching high yields in the biological production of streptokinase.

The growth of bacteria depends on many factors. Of special importance are the composition of the nutrient medium which must be adapted to the specific requirements of the metabolism of the bacteria, the pH-value of the medium, which must be most favorable for the growth of the bacteria at the beginning of the culture, and the steadiness of the hydrogen ion concentration with bacteria liable of changing the pH-value by consumption of nutrient medium. Thus, e. .g. in the culture of streptococci, especially of the strain H 46 A generally used for the formation of streptokinase, it is necessary that the acids formed by the fermentation of sugar are continuously neutralized in order not to impair bacterial growth.

Even in a given culture medium under optimum pH-conditions, the growth of a bacterium still depends on other conditions, e. g. the nature of the preliminary culture. The growth is influenced according to generally known principles by the amount of microorganisms especially capable of propagation used in the culture for inoculation. The latter requires cultures containing numerous living microorganisms.

Under these preconditions the growth of bacteria generally proceeds according to a logarithmic curve that continuously can be observed by measuring the degree of turbidity.

The bacterial formation of biologically active subtances takes place in various ways. In some microorganisms, e. g. in tetanus bacteria, at first an accumulation of endotoxin occurs in the body of the bacterium so that this endotoxin is liberated and made detectable in the nutrient broth only after longer incubation time by decomposition of the dead bacteria. Other bacteria, however, e.g. diphtheria-bacteria, continuously secrete biologically active products which can be found increasingly in the culture medium already a short time after the beginning of the growth.

As mentioned before, the growth of bacteria in a given culture medium is also influenced by the type of the inoculation. In many experiments with streptokinase-forming streptococcus strains it was observed, however, that despite equal inoculation, fluctuations occurred as to the maximum of the formed streptokinase, although the process of growing itself was but slightly disturbed.

Now, it has been found that especially high yields of streptokinase are obtained when a preculture of a streptokinase-forming streptococcus strain whose age—by a preliminary test—was found to be particularly favorable for the streptokinase formation in the main culture is used for the production in the main culture. It has been found especially desirable to use an about 7 to 9 hours old preculture of a streptokinase-forming streptococcus strain for the production in the main culture.

For this purpose, e. g. the growth of streptococci of the strain H 46 can continuously be observed by measuring the turbidity in the preliminary culture, and at definite times, viz. in determined phases of the logarithmic curve, the main cultures can be prepared by inoculation on fresh culture medium. The most favorable yields were obtained in the scope of optical densities of $$E_\lambda = ^{1.0}_{620} \, m\mu = 0.200 - 0.335$$

where the maximum is at 0.275. This phase was usually observed between 6.5 and 9.5 hours. When the incubation time of the preculture is longer and the optical density above $$E_\lambda = ^{1.0}_{620} \, m\mu = 0.335$$

the capability of streptokinase formation of the streptococci growing in the main culture strongly decreases. In the main cultures the curve of growth can again be determined and the streptokinase formation can continuously be observed.

The diagram graphically shows the result of the process according to the invention. Curve I resulted from the values of turbidity or the so-called optical densities (OD) in the preculture after dilution 1:5. Curve II represents the optimum streptokinase values of various main cultures which were inoculated with the preliminary culture at suitable times.

By means of this method of a well-timed transfer of the preliminary culture onto the main culture, maximum streptokinase quantities can be obtained.

*Example*

Streptococci of the streptokinase-forming strain H 46 A are cultivated in a blood agar flask at 37° C. From 4 flasks after 24 hours the increased microorganisms are flushed with a sterile broth prepared by pancreatic digestion of beef (Pope method, C. G. and M. L. Smith, J. Path. Bact. 35, 573, 1932), transferred into 10 litres of the same broth and incubated at 37° C. until the optical density $$E_\lambda = ^{1.0}_{620} \, m\mu = 0.28$$

was reached. This occurred after 8 hours. This solution designated as preculture was added into 80 litres of the Müller-medium (WHO, Techn. Rep. Ser. 61, 46, 1953) containing additionally 2% of glucose, heated at 37° C. and kept cautiously at the pH-value of 7.0 to 7.8, if necessary under automatic aftertitration with 1 N of sodium hydroxide solution to be carried out with an autotitrator. The so treated culture solution yielded 620 units/ml. of culture liquid of streptokinase.

We claim:
1. A process which comprises incubating a streptokinase-forming streptococcus strain H46A in a preculture medium for between about 6.5 and 9.5 hours and until the optical density

$$E_\lambda = ^{1.0}_{620} \, m\mu$$

thereof is between about 0.200 and 0.335 after 1:5 dilution, inoculating a main culture medium with said preculture, and maintaining said inoculated main culture medium at a pH between 7.0 and 7.8 to form streptokinase.

2. The process defined in claim 1 wherein the streptokinase-forming streptococcus strain is incubated in the preculture medium for about eight hours at 37° C and until the optical density has reached about 0.28.

References Cited in the file of this patent

Methods in Enzymology, vol. I, pages 132 to 137.

Journal of General Physiology, vol. 28, pages 363 to 383 (1945), pages 363–366 particularly relied on.

Journal of Clinical Investigation, vol. 28, pages 163 to 172 (1949), page 163 particularly relied upon.